US 11,056,694 B2

(12) United States Patent
Wilson

(10) Patent No.: US 11,056,694 B2
(45) Date of Patent: Jul. 6, 2021

(54) FUEL CELL SUB-ASSEMBLY

(71) Applicant: Intelligent Energy Limited, Loughborough (GB)

(72) Inventor: Antony Richard Wilson, Loughborough (GB)

(73) Assignee: Intelligent Energy Limited, Road Loughborou (GB)

(*) Notice: Subject to any disclaimer, the term of this patent is extended or adjusted under 35 U.S.C. 154(b) by 475 days.

(21) Appl. No.: 15/761,345

(22) PCT Filed: Sep. 23, 2016

(86) PCT No.: PCT/GB2016/052964
§ 371 (c)(1),
(2) Date: Mar. 19, 2018

(87) PCT Pub. No.: WO2017/055815
PCT Pub. Date: Apr. 6, 2017

(65) Prior Publication Data
US 2018/0269498 A1  Sep. 20, 2018

(30) Foreign Application Priority Data
Sep. 30, 2015  (GB) ..................... 1517245

(51) Int. Cl.
*H01M 8/0273* (2016.01)
*H01M 8/242* (2016.01)
(Continued)

(52) U.S. Cl.
CPC ....... *H01M 8/0273* (2013.01); *H01M 8/0247* (2013.01); *H01M 8/1007* (2016.02); *H01M 8/242* (2013.01); *H01M 8/2457* (2016.02); *H01M 8/2483* (2016.02); *H01M 2008/1095* (2013.01)

(58) Field of Classification Search
CPC .................................................. H01M 8/0273
See application file for complete search history.

(56) References Cited

U.S. PATENT DOCUMENTS

2002/0172852 A1  11/2002  Frank et al.
2003/0082430 A1*  5/2003  Suzuki ............... H01M 8/0271
429/510

(Continued)

FOREIGN PATENT DOCUMENTS

KR  10-1377187 B1  3/2014

OTHER PUBLICATIONS

Definition (Year: 2020).*
(Continued)

*Primary Examiner* — Brian R Ohara
(74) *Attorney, Agent, or Firm* — Bakerhostetler

(57) ABSTRACT

A fuel cell sub-assembly (100) comprising; a gasket (101) comprising a peripheral seal (102) for a fuel cell assembly, the peripheral seal defining a central aperture (103) of the gasket; a gas diffusion layer (104) for providing diffused gases to a proton exchange membrane (503) of a fuel cell, the gas diffusion layer (104) located within the central aperture; wherein at at least one convection point (105, 106), an inside facing surface (107) of the peripheral seal of the gasket is welded to a corresponding outward facing surface (108) of the gas diffusion layer (104).

16 Claims, 2 Drawing Sheets

(51) Int. Cl.
*H01M 8/0247* (2016.01)
*H01M 8/2483* (2016.01)
*H01M 8/2457* (2016.01)
*H01M 8/1007* (2016.01)
*H01M 8/1018* (2016.01)

(56) References Cited

U.S. PATENT DOCUMENTS

2014/0017590 A1 1/2014 Sugishita et al.
2014/0120452 A1* 5/2014 Yamauchi ............ H01M 8/0284
429/480
2014/0356762 A1 12/2014 Gao
2016/0329592 A1 11/2016 Kim et al.

OTHER PUBLICATIONS

Definitions (Year: 2020).*
International Patent Application No. PCT/GB2016/052964; Int'l Search Report and the Written Opinion; dated Dec. 16, 2016; 14 pages.
International Patent Application No. PCT/GB2016/052964; Int'l Preliminary Report on Patentability; dated Apr. 12, 2018; 10 pages.

* cited by examiner

FUEL CELL SUB-ASSEMBLY

The invention relates to a fuel cell sub-assembly, and in particular to a combination of a gasket and a gas diffusion layer. It also relates to a fuel cell and a fuel cell stack incorporating the fuel cell sub-assembly. A method of assembling a fuel cell is also disclosed.

In fuel cells, an oxidant fluid is directed across the cathode side of each fuel cell, so that oxidant is available to the cathode side of a proton exchange membrane or membrane-electrode assembly (MEA) of the fuel cell, typically via a diffusion layer. Further, a fuel is directed across the anode side of each fuel cell, so that fuel is available to the anode side of the MEA of the fuel cell, typically via a diffusion layer. The diffusion layer is of a porous material to allow the fuel or oxidant to diffuse therethrough as it flows to the MEA. Thus, an inlet channel may be configured to introduce the fuel or oxidant into the diffusion layer and an outlet channel may be configured receive any un-reacted fuel or oxidant or reaction by-products from the diffusion layer.

In accordance with a first aspect of the invention there is provided a fuel cell sub-assembly comprising:
- a gasket comprising a peripheral seal for a fuel cell assembly, the peripheral seal defining a central aperture of the gasket;
- a gas diffusion layer for providing diffused gases to a proton exchange membrane of a fuel cell, the gas diffusion layer located within the central aperture;
- wherein at at least one connection point, an inside facing surface of the peripheral seal of the gasket is welded to a corresponding outward facing surface of the gas diffusion layer.

The sub-assembly is advantageous as it may simplify manufacture of a fuel cell incorporating the fuel cell sub assembly. The gas diffusion layer may be configured to lie at least partly within the plane of the gasket and may be wholly within the bounds of the central aperture. The weld at the connection point has been found to securely hold the sub-assembly together without substantially interfering with the sealing properties of the gasket. Further, the weld, which may comprise an ultrasonic weld or a laser weld, may allow for intermingling of gasket material with the porous gas diffusion layer.

Optionally, the gas diffusion layer is configured to substantially fill the central aperture. The gas diffusion layer may be configured to be thicker than the gasket (in a direction perpendicular to the plane of the gasket and the gas diffusion layer) when uncompressed.

Optionally, the gas diffusion layer is substantially planar having a first major face, a second major face opposite the first major face and a plurality of surfaces between the first and second major faces, the connection point located on at least one of said plurality of surfaces.

Optionally, the gas diffusion layer, except at the or each connection point, is substantially uniformly spaced by a predetermined spacing from the inside facing surface of the gasket for forming a gallery. By presenting a spacing between the gasket and the gas diffusion layer, the sub-assembly may provide for unimpeded gas flow around the gas diffusion layer such that the gas diffusion layer can receive gas from one or more sides. The gas diffusion layer may or may not include spacing tabs to maintain the spacing during assembly. In some examples, the presence of the weld may obviate the need for any spacing tabs.

Optionally, the gasket includes a channel extending from its inside facing surface into the peripheral seal for providing a fluid connection to a fluid transfer conduit (when assembled) and the at least one connection point is adjacent the channel. The channel may be an outlet channel or an inlet channel. Providing the or each connection point adjacent an outlet channel may be advantageous for guiding fluid out of the gas diffusion layer and into the channel.

Optionally, the sub-assembly includes at least two distinct connection points where the gasket is welded to the gas diffusion layer, the connection point located adjacent the channel, one either side thereof. Having the connection points either side of the channel or a gallery around the channel may advantageously guide fluid flow to/from the gas diffusion layer from/into the channel.

Optionally, the gas diffusion layer is substantially rectangular defined by four outwardly facing surfaces and the central aperture is substantially rectangular defined by four inwardly facing surfaces of the peripheral seal, and the or each connection point is located between a particular one of the four surfaces of the gas diffusion layer and a particular one of the four surfaces of the gasket.

Optionally, the gas diffusion layer is of a porous material having spaces between gas diffusion layer material, and at the or each connection point, material of the gasket is comingled with the material of the gas diffusion layer. The gasket may be of one or more of a polymeric material, a plastics material, a natural or synthetic rubber material or any other suitable material that may be welded. The gasket may be flowable when subject to welding energy, such as ultrasonic welding energy.

Optionally, at the or each connection point, the material of the gasket tapers as it extends into the gas diffusion layer and comingles with the gas diffusion layer material. Thus, the thickness of gasket may narrow, at the connection point, as its material extends into the pores/gaps/spaces of gas diffusion layer.

Optionally, the gas diffusion layer and the gasket are substantially planar and a thickness of the gas diffusion layer is greater than a thickness of the gasket and, at the or each connection point, the comingled gasket material and gas diffusion layer material is provided over only part of the thickness of the gas diffusion layer. Thus, in its uncompressed form, the gas diffusion layer may be joined over only a portion of its thickness, which may be a portion adjacent to one major face or in a central region between its major faces.

Optionally, the gasket is substantially planar and has a first major face, a second major face opposite the first major face, the separation between the first and second major faces defining the thickness of the gasket and wherein the comingled gasket material and gas diffusion layer material extends substantially between planes defined by the first and second major faces of the gasket.

Optionally, the comingled material extends solely between the planes.

Optionally, the gasket is;
i) an anode gasket for sealing between an anode flow plate and a proton exchange membrane; or
ii) an cathode gasket for sealing between a cathode flow plate and a proton exchange membrane.

The anode flow plate and/or cathode flow plate may comprise a bipolar flow plate.

Optionally, the gasket is an anode gasket and the sub-assembly includes an anode flow plate configured to provide an anode gas to the gas diffusion layer, the gasket and the gas diffusion layer configured to lie against a face of the anode flow plate.

The anode flow plate may be configured to provide anode gas to the by virtue of a delivery conduit formed therein and/or flow channels to carry the anode gas over the gas diffusion layer, such as over a major face of the gas diffusion layer.

According to a second aspect of the invention we provide a fuel cell comprising a proton exchange membrane, an anode flow plate configured to provide an anode gas to an anode gas diffusion layer and a cathode flow plate configured to provide an cathode gas to a cathode gas diffusion layer, wherein the fuel cell includes at least one fuel cell sub-assembly of the first aspect, the gas diffusion layer of the fuel cell sub-assembly forming said anode gas diffusion layer or said cathode gas diffusion layer.

According to a third aspect of the invention we provide a fuel cell stack comprising a plurality of fuel cells as defined in the second aspect arranged together in a stack.

According to a fourth aspect of the invention we provide method of assembling a fuel cell using the fuel cell sub-assembly of the first aspect, comprising the steps of;
receiving an anode flow plate having the fuel cell sub assembly arranged thereon;
applying a proton exchange membrane to the fuel cell sub assembly on an opposed side to the anode flow plate;
applying a further fuel cell sub-assembly to the proton exchange membrane;
applying a cathode flow plate to the further fuel cell sub-assembly on an opposed side to the proton exchange membrane.

The use of a fuel cell sub assembly may simplify assembly.

According to a fifth aspect of the invention we provide a method of manufacturing a fuel cell sub-assembly comprising;
receiving a gasket comprising a peripheral seal for a fuel cell assembly, the peripheral seal defining a central aperture of the gasket;
receiving a gas diffusion layer for providing diffused gases to a proton exchange membrane of a fuel cell, the gas diffusion layer located within the central aperture;
applying a weld at at least one connection point, the weld configured to be between an inside facing surface of the peripheral seal of the gasket and a corresponding outward facing surface of the gas diffusion layer.

The weld may comprise an ultrasonic weld or a laser weld.

The step of applying a weld may comprise applying an ultrasonic welding head to the at least one connection point and applying ultrasonic energy to at least the gasket, wherein the ultrasonic welding head is;
a) translated in a direction from the gasket towards the gas diffusion layer during application of ultrasonic energy; and/or
b) inclined to a normal direction to a plane of the gasket in a direction towards the gas diffusion layer to urge molten gasket material towards the gas diffusion layer during application of ultrasonic energy.

Thus, the method may include applying ultrasonic or laser energy to the gasket material adjacent the connection point to melt the gasket material and urging molten gasket material towards the gas diffusion layer to comingle therewith by way of an inclination of a welding head and/or translation of the welding head towards the gas diffusion layer.

Aspects and embodiments of the invention are described in further detail below by way of example and with reference to the enclosed drawings in which.

A fuel cell may be formed from a plurality of layers that may be arranged and optionally compressed together to form a fuel cell having sealed volumes either side of an MEA for receipt of oxidant and fuel. The sealed volumes typically include a gas diffusion layer comprising a porous material to aid the diffusion of oxidant or fuel across the whole area of the respective sides of the MEA. The plurality of fuel cell layers may include an MEA for forming an electrochemical reaction site; a catalyst layer for catalysing the reaction; a gas diffusion layer (GDL) (which may include a microporous layer) for aiding diffusion of fuel or oxidant; a fuel cell plate for separating individual fuel cells in a stack; bipolar plates for providing an electrically conductive connection between fuel cells in a stack; and gaskets for forming seals between the other layers.

Typically, the layers of the fuel cell are thin and require careful handling when assembling the layers to form a fuel cell. Providing a sub-assembly of two or more of layers that form the fuel cell may be advantageous.

Figure 1:
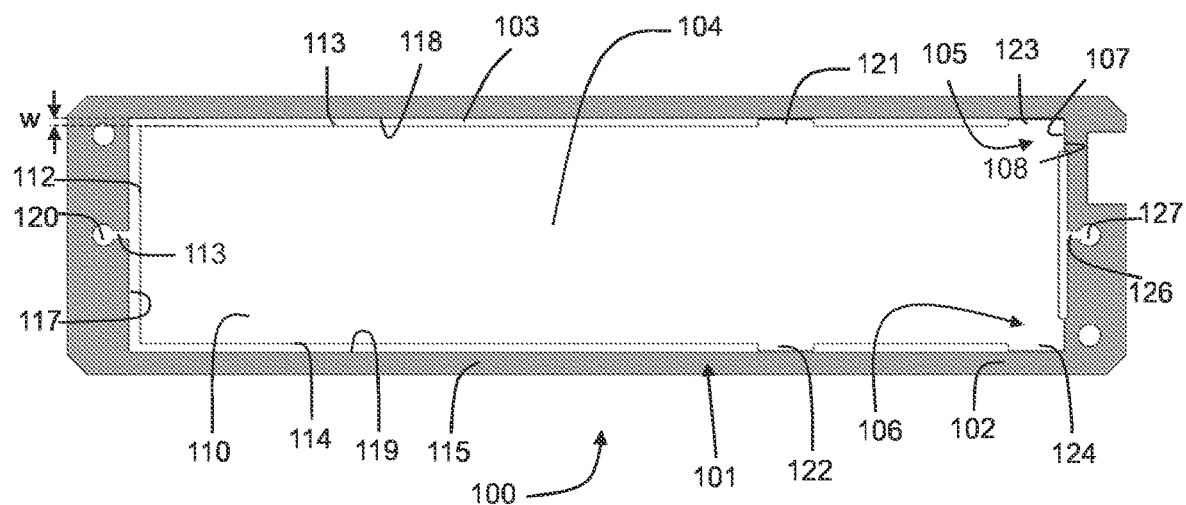
FIG. 1 is a plan view of one example of a fuel cell sub-assembly comprising a gasket and a gas diffusion layer.
Figure 2:
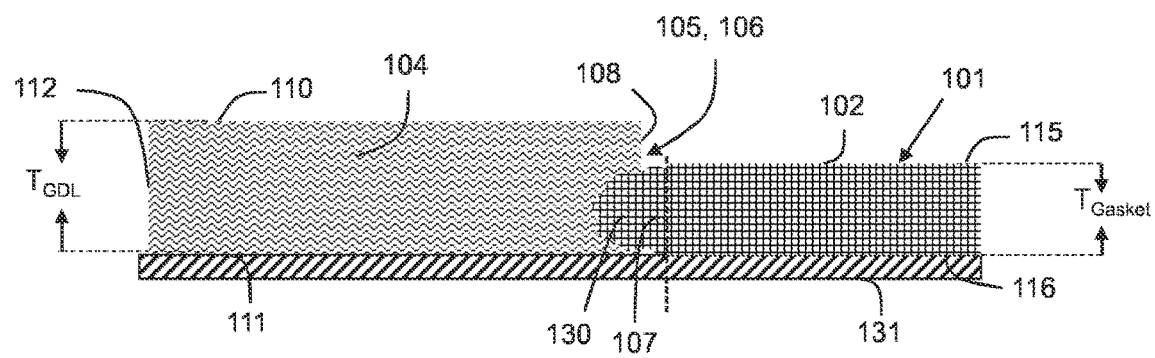
FIG. 2 is a side view of one example of the fuel cell sub-assembly.

FIGS. 1 and 2 show a fuel cell sub-assembly 100 comprising a gasket 101. The gasket 101 has a peripheral seal 102 for a fuel cell assembly. The peripheral seal 102 defines a central aperture 103 of the gasket 101. A gas diffusion layer 104 for providing diffused gases to a proton exchange membrane of a fuel cell is located within the central aperture 103. At at least one connection point 105, 106 (two connection points are shown in FIG. 1), an inwardly facing surface 107 of the peripheral seal of the gasket is welded to a corresponding outward facing surface 108 of the gas diffusion layer 104.

The gas diffusion layer is of a porous material and may comprise a heterogeneous matrix of GDL material and air gaps. The GDL may be fibrous having air gaps between the fibres in which the oxidant or fuel may flow. In other examples the GDL may be an open cell foam material. The gas diffusion layer 104 is substantially planar having a first major face 110, a second major face 111 opposite the first major face 110 and a plurality of surfaces (or "sides") 108, 112, 113, 114 between the first and second major faces 110, 111. The separation between the first and second major faces defines the thickness, $T_{GDL}$, of the gas diffusion layer. The planar gas diffusion layer 104 is substantially rectangular with the four sides of the rectangle provided by the four outwardly facing surfaces 108, 112, 113, 114.

The gasket 101 is substantially planar and has a first major face 115 and a second major face 116 opposite the first major face. The separation between the first and second major faces 115, 116 defines a thickness of the gasket, $T_{gasket}$. The major faces 115, 116 of the gasket are configured to seal against the other layers of the fuel cell when assembled. The gasket 101 comprises a continuous ring, which in this example is a substantially rectangular ring. The ring shape defines the central aperture 103. Accordingly, the height of the inwardly facing surface 107 and another three inwardly facing surfaces 117, 118, 119, that extend between the major faces 115, 116, form the rectangular shape and define the thickness of the gasket 101. It will be appreciated that the gasket may have other shapes, which may be ring shaped or not.

The GDL 104 is arranged in the plane of the gasket. The GDL 104 substantially fills the central aperture 103. In particular, the GDL 104 is joined to the gasket along only one of its side surfaces, namely surface 108. Likewise, the gasket 101 is joined to the GDL along only one of its side surfaces, namely surface 107. Along the other surfaces, the GDL 104 and the gasket 101 are separated by a separation distance, w. Thus, surfaces 113 and 118; 114 and 119; 112 and 117 are separated by separation distance w. The separation distance w is small relative to the width of the GDL 104 and may comprise less than 5 mm, 2 mm or 1 mm. The separation between the GDL 104 and the gasket 101 is provided to form a gallery to allow oxidant or fuel introduced into the central aperture (when assembled with the fuel cell layers) to flow around the GDL and permeate into it from multiple sides 112, 113, 114. This may be advantageous as typically the fuel or oxidant is introduced from one or more channels 120 formed in the plates (not shown) at an edge and around which the gasket seals. Thus, an inlet channel 125 in the gasket 104 provides for transfer of fuel or oxidant from the channel 120 to the GDL 104. It will be appreciated that the gasket and the GDL may be welded over two sides, three sides, four sides or any other number of sides.

The GDL 104, in this example, includes alignment tabs 121, 122, 123 and 124 to position the GDL 104 within the central aperture to provide the separation distance, w. The alignment tabs may extend from the side surfaces 113 and 114 to contact respective inwardly facing surfaces 118, 119 of the gasket 101.

The gasket 101 may include one or more outlet channels 126 that extend outwardly from one or more of the inwardly facing surfaces 107, 117, 118, 119. The channel(s) provide for transfer of fuel or oxidant from the GDL 104 to a channel 127 in the plates (not shown), which the gasket 101 is configured to seal around when assembled with the plates. The GDL 104 is positioned relative to the gasket 101 such that the GDL 104 is spaced from the surface 107 at the mouth of the channel 126 to form an outlet gallery 128. The outlet gallery 128 is bounded on either side by the connection points 105, 106. Such an arrangement of the gallery 128 and the connection points 105, 106 either side thereof has been found to be advantageous in guiding fuel or oxidant into the channels 126, 127. It is also advantageous that the connection points 105, 106 are formed on the same surface 107 of the gasket 101 as the one or more channels 126.

Turning to FIG. 2, which shows a cross section through one of the connection points 105, 106, shows that the weld presents itself as material of the gasket 102 that has comingled at projection 130 with the material of the porous GDL 104. Thus, the projection 130 comprises the material of the gasket that projects into the GDL 104. The dashed line in FIG. 2 represents the position of the surface 107 away from the connection points 105, 106. Thus, at the connection point, the weld has caused the material of the gasket to project from the side 107 and into the GDL 104 to form the join between the gasket and the GDL. Further, the thickness $T_{GDL}$ of the GDL may be greater than the thickness $T_{gasket}$ of the gasket 101 at least at the projection 130 and may be greater than the average thickness of the entire gasket 101. Accordingly, the GDL 104 may be of a thickness $T_{GDL}$, greater than the height of the weld or projection 130, which may be considered less than or substantially equal to the thickness of the gasket, $T_{gasket}$. This is advantageous as the GDL may be configured to provide a particular density when compressed between a fuel cell plate and a MEA. Further, the presence of the weld may present a gradual GDL density increase towards the surface 107 which may assist in guiding fuel or oxidant to the channel 126.

Figure 3:
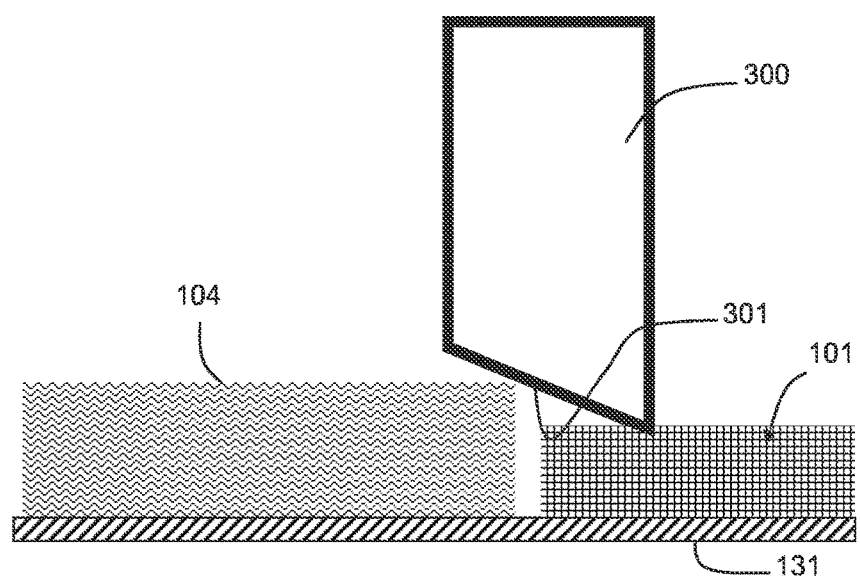
FIG. 3 is a side view of FIG. 2 prior to ultrasonic welding of the gasket to the gas diffusion layer.

FIG. 3 shows the gasket 101 and the GDL 104 prior to the weld being formed. The weld is in this example an ultrasonic weld and is provided by sonotrode 300. The sonotrode 300 may include a head 301 that is inclined towards the GDL 104. In particular, when the weld is applied, the head of the sonotrode may be inclined between 1 and 45° to the plane of the GDL 104 and gasket 101 and optionally between 5 and 30° or between 10 and 20°. The inclination of the head may encourage gasket material to flow towards the GDL 104. Further, the sonotrode 300 may be translated towards the GDL 104 during the welding operation to further encourage molten gasket material to flow towards the GDL 104. The inclination of the head 301 and/or translation of the sonotrode may assist in comingling the gasket material with the porous GDL material. It will be appreciated that in other examples only the inclined head 301 or only the translation may be used to form the weld. Thus, the sonotrode head 301 may face the plane of the gasket and the GDL and may be inclined to direct ultrasonic energy toward the gasket but in a direction inclined to the normal toward the GDL.

While in this example an ultrasonic weld is provided, in other examples, a laser weld may be used. Translation of the laser may encourage molten gasket material to flow towards the GDL 104.

In FIGS. 2 and 3 the sub assembly 100 is shown mounted on a fuel cell anode plate 131, which may be of metal. However, the weld need not be formed while the GDL 104 and gasket 101 are lying against an anode plate 131.

Figure 4:
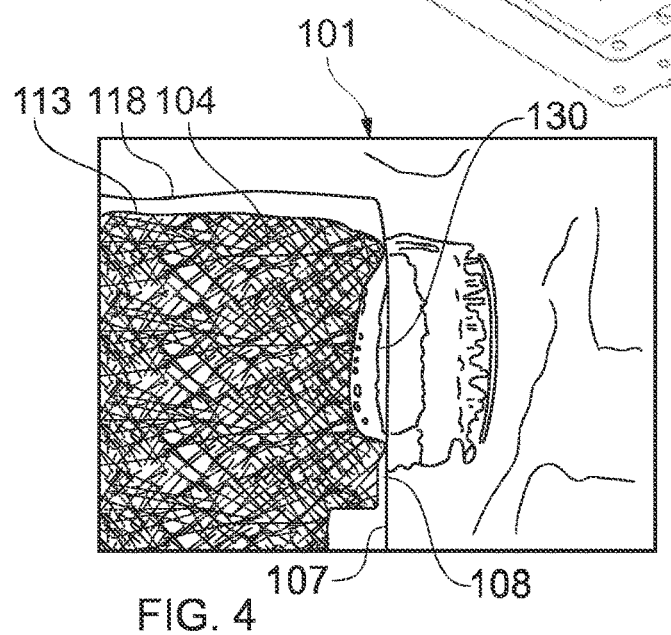
FIG. 4 is a detailed view of an example weld between the gasket and the gas diffusion layer.

FIG. 4 shows a plan view of the weld where the projection 130 can be seen to comprise the material of the gasket that has flowed and set within the porous GDL 104.

While in the above examples, the gasket and GDL are substantially flat members that lie in a plane, they may be curved or of other shapes.

Figure 5:
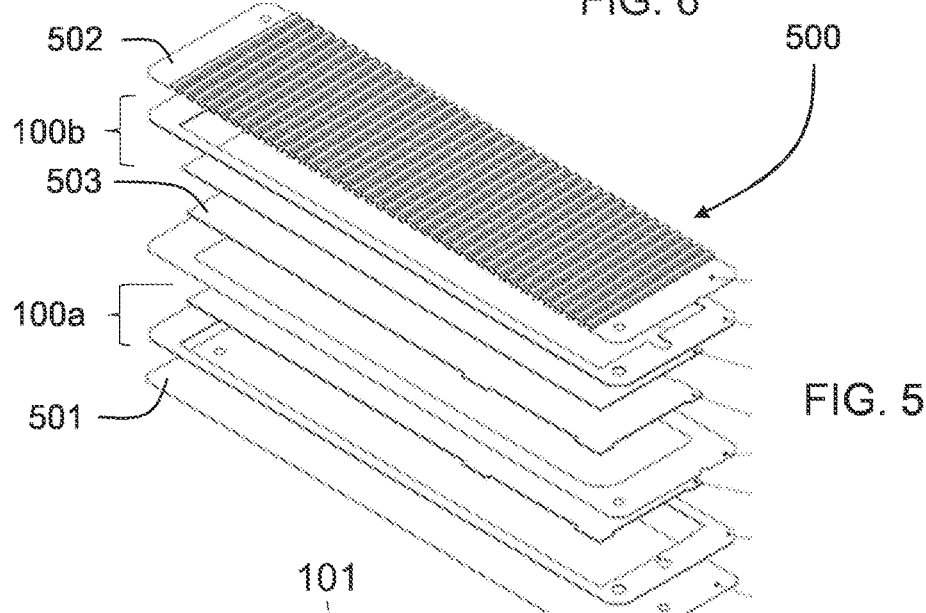
FIG. 5 is a exploded view showing component parts of an example fuel cell.

FIG. 5 shows where the fuel cell sub-assembly 100 is located in a fuel cell formed of a plurality of layers 500. The fuel cell layers 500 comprise an anode flow plate 501 and a cathode flow plate 502. Between the flow plates 501, 502 lies the MEA 503, which has an anode side facing the anode flow plate 501 and a cathode side facing the cathode flow plate 502. The sub-assembly 100 may be used on the anode side or the cathode side of the MEA 503. The gasket is thus configured to form a peripheral seal between the anode side of the MEA 503 and the anode flow plate 501 or form a peripheral seal between the cathode side of the MEA 503 and the cathode flow plate 502. In the example of FIG. 5, the fuel cell sub-assembly 100a is provided on the anode side and a further fuel cell sub-assembly 100b is provided on the cathode side.

Figure 6:
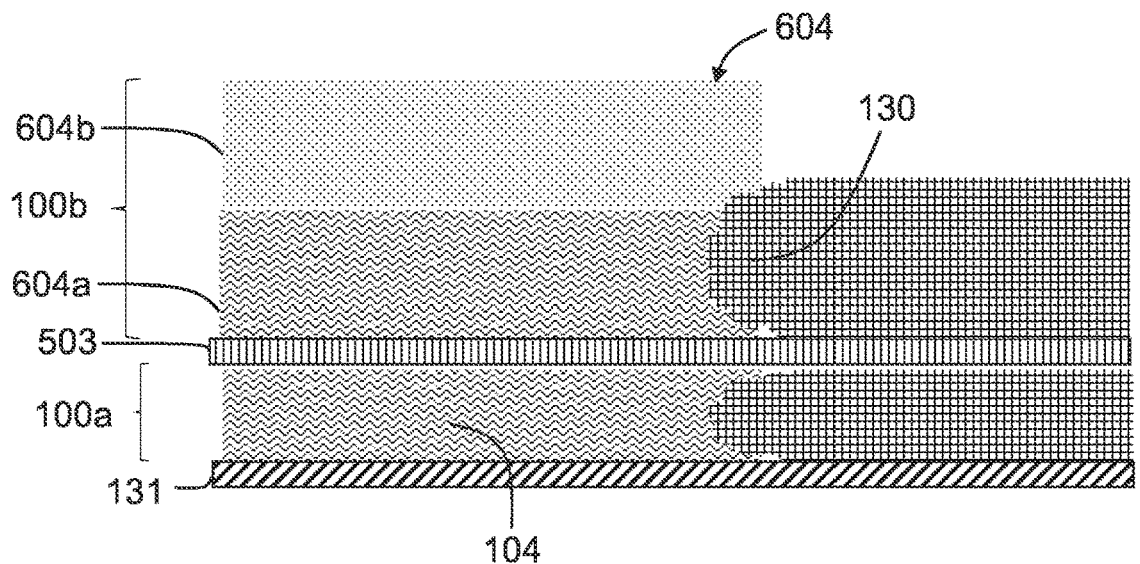
FIG. 6 is a side view of two fuel cell sub-assemblies arranged to form a fuel cell.

FIG. 6 shows a cross section during the assembly of the fuel cell and shows the sub-assembly 100, now numbered 100a in accordance with FIG. 5, located between the anode plate 131 and the MEA 503. The GDL 104 has been compressed to substantially the same width as the gasket 101, which may itself be compressed to form the seal with the anode plate 131 and the MEA 503. The further fuel cell sub-assembly 100b is shown lying against the cathode side of the MEA 503. In this example, the further fuel cell sub-assembly 100b is substantially similar to the sub assembly 100a and the same reference numerals have been used except for "500" being added to them.

The difference between the sub assembly 100a and the sub assembly 100b is that the GDL 604 comprises two planar parts 604a and 604b that are arranged face to face. The GDL parts 604a and 604b may have different porosities. The weld or projection 130 is configured to extend into both of the planar parts to hold them together with the gasket 104.

Figure 7:
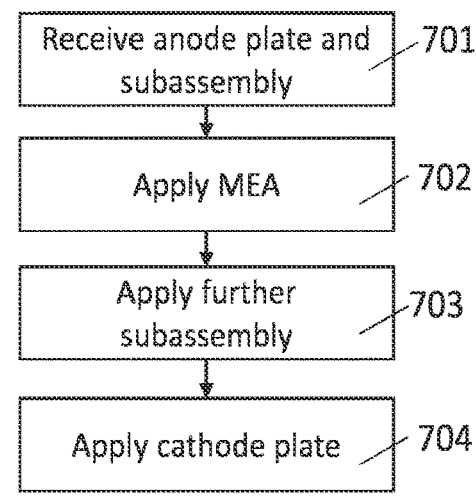
FIG. 7 shows a flow chart illustrating an example method of assembling the fuel cell sub-assembly into a fuel cell.

FIG. 7 shows a flowchart illustrating an example method for assembling a fuel cell using the fuel cell sub-assembly 100. The method comprises the steps of;
receiving 701 an anode flow plate 131 having the fuel cell sub assembly 100a arranged thereon;
applying 702 a proton exchange membrane to the fuel cell sub assembly on an opposed side to the anode flow plate;
applying 703 a further fuel cell sub-assembly to the proton exchange membrane;
applying 704 a cathode flow plate to the further fuel cell sub-assembly on an opposed side to the proton exchange membrane.

Thus, a fuel cell may be formed comprising a proton exchange membrane, an anode plate, a cathode plate wherein the fuel cell sub assembly 100 is configured between the proton exchange membrane and one of the anode plate or cathode plate. In other embodiments, the fuel cell may include two sub-assemblies; a first sub-assembly and a second sub-assembly, the first sub-assembly between the proton exchange membrane and the anode plate and the second sub-assembly between the proton exchange membrane and the cathode plate. In some examples, the anode plate and cathode plate may comprise bipolar plates. A plurality of such fuel cells may be arranged together face to face to form a fuel cell stack.

The invention claimed is:

1. A fuel cell sub-assembly comprising;
a gasket comprising a peripheral seal for a fuel cell assembly, the peripheral seal defining a central aperture of the gasket;
a gas diffusion layer porus and with less rigidity than the gasket for providing diffused gases to a proton exchange membrane of a fuel cell, the gas diffusion layer located within the central aperture;
wherein the gas diffusion layer is configured with several protrusions forming connection points and alignment tabs and at least one connection point (105/106) of the gas diffusion layer is welded to an inside facing surface of the peripheral seal of the gasket (107) at a corresponding outward facing surface (108) of the gas diffusion layer; and,
wherein the gas diffusion layer, except at the or each connection point (105 and 106) and each alignment tab (121, 122, 123 and 124), each of which is formed from a portion of the gas diffusion layer is substantially uniformly spaced by a predetermined spacing from the inside facing surface of the gasket for forming a gallery.

2. A fuel cell sub-assembly according to claim 1, in which the gas diffusion layer is configured to substantially fill the central aperture.

3. A fuel cell sub-assembly according to claim 1, in which the gas diffusion layer is substantially planar having a first major face, a second major face opposite the first major face and a plurality of surfaces between the first and second major faces, the connection point located on at least one of said plurality of surfaces.

4. A fuel cell sub-assembly comprising;
a gasket comprising a peripheral seal for a fuel cell assembly, the peripheral seal defining a central aperture of the gasket;
a gas diffusion layer for providing diffused gases to a proton exchange membrane of a fuel cell, the gas diffusion layer located within the central aperture; and
wherein the gas diffusion layer is configured with several protrusion forming connection points and alignment tabs;
wherein at least one connection point, an inside facing surface of the peripheral seal of the gasket is welded to a corresponding outward facing surface of the gas diffusion layer; and,
wherein the gasket includes a channel extending from its inside facing surface into the peripheral seal for providing a fluid connection to a fluid transfer conduit and the at least one connection point is adjacent the channel.

5. A fuel cell sub-assembly according to claim 4, in which the sub-assembly includes at least two distinct connection points where the gasket is welded to the gas diffusion layer, the connection point located adjacent the channel, one either side thereof.

6. A fuel cell sub-assembly according to claim 1, in which the gas diffusion layer is substantially rectangular defined by four outwardly facing surfaces and the central aperture is substantially rectangular defined by four inwardly facing surfaces of the peripheral seal, and the or each connection point is located between a particular one of the four surfaces of the gas diffusion layer and a particular one of the four surfaces of the gasket.

7. A fuel cell sub-assembly according to claim 1, in which the gas diffusion layer is of a porous material having spaces between gas diffusion layer material, and at the or each connection point, material of the gasket is comingled with the material of the gas diffusion layer.

8. A fuel cell sub-assembly according to claim 7, in which, at the or each connection point, the material of the gasket tapers as it extends into the gas diffusion layer and comingles with the gas diffusion layer material.

9. A fuel cell sub-assembly according to claim 7, in which the gas diffusion layer and the gasket are substantially planar and a thickness of the gas diffusion layer is greater than a thickness of the gasket and, at the or each connection point, the comingled gasket material and gas diffusion layer material is provided over only part of the thickness of the gas diffusion layer.

10. A fuel cell sub-assembly according to claim 7, in which the gasket is substantially planar and has a first major face, a second major face opposite the first major face, the separation between the first and second major faces defining the thickness of the gasket and wherein the comingled gasket material and gas diffusion layer material extends substantially between planes defined by the first and second major faces of the gasket.

11. A fuel cell sub-assembly according to claim 1, in which the gasket is;
i) an anode gasket for sealing between an anode flow plate and a proton exchange membrane; or
ii) a cathode gasket for sealing between a cathode flow plate and a proton exchange membrane.

12. A fuel cell sub-assembly according to claim 1, in which the gasket is an anode gasket and the sub-assembly includes an anode flow plate configured to provide an anode gas to the gas diffusion layer, the gasket and the gas diffusion layer configured to lie against a face of the anode flow plate.

13. A fuel cell comprising a proton exchange membrane, an anode flow plate configured to provide an anode gas to an anode gas diffusion layer and a cathode flow plate configured to provide an cathode gas to a cathode gas diffusion layer, wherein the fuel cell includes at least one of the fuel cell sub-assembly of claim 1, the gas diffusion layer of the fuel cell sub-assembly forming said anode gas diffusion layer or said cathode gas diffusion layer.

14. A fuel cell stack comprising a plurality of fuel cells as defined in claim 13 arranged together in a stack.

15. The fuel cell sub-assembly of claim 1, wherein the gasket is welded via a laser weld or an ultrasonic weld.

16. A fuel cell sub-assembly comprising:
- a gasket comprising a peripheral seal for a fuel cell assembly, the peripheral seal defining a central aperture of the gasket;
- a gas diffusion porous and with less rigidity then the gasket layer for providing diffused gases to a proton exchange membrane of a fuel cell, the gas diffusion layer located within the central aperture;
- the gas diffusion layer is substantially rectangular defined by four outward facing surfaces; and
- wherein the gas diffusion layer is configured with at least one protrusion forming connection points and alignment tabs;
- the central aperture is substantially rectangular defined by four inward facing surfaces of the peripheral seal;
- at least one connection point is formed between a particular one of the four surfaces of the gas diffusion layer and a particular one of the four surfaces of the gasket;
- wherein the gas diffusion layer is welded to an inside facing surface of the peripheral seal of the gasket (107) and a corresponding outward face surface (108) of the gas diffusion layer at the at least one connection point; and,
- wherein the gas diffusion layer, except at the at least one or each connection point is substantially uniformly spaced by a predetermined spacing from the inside facing surface of the gasket for forming a gallery.

* * * * *